US005870702A

United States Patent [19]

Yamabana

[11] Patent Number: 5,870,702

[45] Date of Patent: Feb. 9, 1999

[54] WORD CONVERTING APPARATUS UTILIZING GENERAL DICTIONARY AND COOCCURENCE DICTIONARY TO DISPLAY PRIORITIZED CANDIDATE WORDS

[75] Inventor: Kiyoshi Yamabana, Tokyo, Japan

[73] Assignee: NEC Corporation, Tokyo, Japan

[21] Appl. No.: 653,246

[22] Filed: May 24, 1996

[30] Foreign Application Priority Data

May 25, 1995 [JP] Japan .................................... 7-150988

[51] Int. Cl.[6] ...................................................... G06F 17/28

[52] U.S. Cl. .................................... 704/10; 704/2; 704/7; 707/532

[58] Field of Search ................................. 704/10, 2, 4, 5, 704/7, 8; 707/532, 535, 536, 534, 533; 434/156, 157, 167

[56] References Cited

U.S. PATENT DOCUMENTS

| | | | |
|---|---|---|---|
| 4,777,600 | 10/1988 | Saito et al. | 707/535 |
| 4,916,614 | 4/1990 | Kaji et al. | 704/2 |
| 4,942,526 | 7/1990 | Okajima et al. | 704/10 |
| 5,181,163 | 1/1993 | Nakajima et al. | 704/10 |
| 5,329,609 | 7/1994 | Sanada et al. | 704/251 |
| 5,406,480 | 4/1995 | Kanno | 704/10 |
| 5,497,319 | 3/1996 | Chong et al. | 704/2 |
| 5,608,623 | 3/1997 | Sata et al. | 704/4 |
| 5,615,378 | 3/1997 | Nishino et al. | 704/4 |
| 5,617,314 | 4/1997 | Zhong | 707/540 |
| 5,652,898 | 7/1997 | Kaji | 704/10 |

FOREIGN PATENT DOCUMENTS

| | | |
|---|---|---|
| 5012253 A | 1/1993 | Japan . |
| 5-151199 | 6/1993 | Japan . |

*Primary Examiner*—Joseph Thomas
*Attorney, Agent, or Firm*—Foley & Lardner

[57] ABSTRACT

A word converting apparatus displays converted results and cooccurrent examples in a candidate selection menu for allowing the user to easily and definitely select converted results of words in a cooccurrent relationship. A cooccurrence recognizer 15 recognizes a cooccurrent relationship between words using a cooccurrence dictionary 13. A converter 16 refers to a general dictionary 12 and the cooccurrence dictionary 13 to store a converted result corresponding to a word in a result storage unit 17. If a converted result is derived from the general dictionary 12, a candidate storage unit 18 stores the converted result. If a converted result is derived from the cooccurrence dictionary 13, the candidate storage unit 18 searches the cooccurrence dictionary 13 for a cooccurrent example and stores the cooccurrent example. When candidate selection is indicated, a candidate selector 19 displays converted results and cooccurrent examples stored in the candidate storage unit 18, in a candidate selection menu on a display unit 20. When a candidate alternative is selected from the candidate selection menu, the candidate selector 19 instructs the converter 16 to give highest priority to a selected converted result or a converted result corresponding to a selected cooccurrent example, and the converter 16 changes a converted result in the result storage unit 17.

5 Claims, 16 Drawing Sheets

| ENTRY | CONVERTED RESULT | CONVERTED-RESULT ID |
|---|---|---|
| kami | 髪 | KAMI 001 |
| | 紙 | KAMI 002 |
| | 神 | KAMI 003 |
| | 上 | KAMI 004 |
| suku | 好く | SUKU 001 |
| | 梳く | SUKU 002 |
| | 漉く | SUKU 003 |
| | 透く | SUKU 004 |

| WORD 1 | WORD 2 | RESULT 1 | RESULT 2 | COOCCURRENT EXAMPLE | CONVERTED RESULT ID |
|---|---|---|---|---|---|
| kami | suku | 紙 | 漉く | 紙を漉く | K001 |
| | | 髪 | 梳く | 髪を梳く | K002 |
| atsui | natsu | 暑い | 夏 | 暑い夏 | K003 |
| | kami | 厚い | 紙 | 厚い紙 | K004 |

| kami | o | suku | |
|---|---|---|---|
| 髪: KAMI001 | | 好 < : SUKU 001 | 172 |
| 紙: KAMI002 | | 梳 < : SUKU 002 | 173 |
| 神: KAMI003 | | 漉 < : SUKU 003 | |
| 上: KAMI004 | | 透 < : SUKU 004 | |
| | | | |

| kami | o | suku | |
|---|---|---|---|
| 紙を漉< : K001 | | 紙 を 漉 < : K001 | 182 |
| 髪を梳< : K002 | | 髪 を 梳 < : K002 | |
| 髪 : KAMI 001 | | 好 < : SUKU 001 | |
| 紙 : KAMI 002 | | 梳 < : SUKU 002 | |
| 神 : KAMI 003 | | 漉 < : SUKU 003 | |
| 上 : KAMI 004 | | 透 < : SUKU 004 | |

181

17

| kami | o | suku |
|---|---|---|
| 紙 : K 001 | | 漉< : K 001 |
| 髪 : K 002 | | 梳< : K 002 |
| 髪 : KAMI 001 | | 好< : SUKU 001 |
| 紙 : KAMI 002 | | 梳< : SUKU 002 |
| 神 : KAMI 003 | | 漉< : SUKU 003 |
| 上 : KAMI 004 | | 透< : SUKU 004 |

172

173

17

| kami | o | suku |
|---|---|---|
| 髪： K 002 | | 梳く：K 002 |
| 紙： K 001 | | 漉く：K 001 |
| 髪： KAMI 001 | | 好く：SUKU 001 |
| 紙： KAMI 002 | | 梳く：SUKU 002 |
| 神： KAMI 003 | | 漉く：SUKU 003 |
| 上： KAMI 004 | | 透く：SUKU 004 |

| natsu | wa | atsui | kami | da | to | atsui |
|---|---|---|---|---|---|---|
| 夏： K 003 | / | 暑い： K 003 | 紙： K 004 | / | / | 厚い： K 004 |
| | / | 厚い： K 004 | 髪： KAMI 001 | / | / | 暑い： K 003 |
| | | | | | | |

| natsu | wa | atsui | kami | da | to | atsui |
|---|---|---|---|---|---|---|
| 夏： K 003 | / | 暑い： K 003 | 紙： K 004 | / | / | 暑い： K 003 |
| | / | 厚い： K 004 | 髪： KAMI 001 | / | / | 厚い： K 004 |
| | | | | | | |

| natsu | wa | atsui | kami | da | to | atsui |
|---|---|---|---|---|---|---|
| 夏： K 003 | | 厚い： K 004 | 紙： K 004 | / | / | 暑い： K 003 |
| | / | 暑い： K 003 | 髪： KAMI 001 | / | / | 厚い： K 004 |
| | | | | | | |

| ENTRY | CONVERTED RESULT | CONVERTED-RESULT ID |
|---|---|---|
| 電 話 | phone | DENWA 001 |
| | telephone | DENWA 002 |
| かける | break | KAKERU 001 |
| | pour | KAKERU 002 |
| | hang | KAKERU 003 |
| | | |

| WORD 1 | WORD 2 | RESULT 1 | RESULT 2 | COOCCURRENT EXAMPLE | CONVERTED-RESULT ID |
|---|---|---|---|---|---|
| 電 話 | かける | call | make | make a call | K 001 |
| | | ring | give | give a ring | K 002 |
| | | | telephone | telephone | K 003 |
| | | | | | |

| 電 話 (denwa) | を (o) | かける (kakeru) |
|---|---|---|
| call : K001 | | make : K00 1 |
| ring : K002 | | give : K00 2 |
| | | telephone : K00 3 |
| phone : DENWA 001 | | break : KAKERU 001 |
| telephone : DENWA 002 | | pour : KAKERU 002 |
| | | hang : KAKERU 003 |

| 電 話 (denwa) | を(o) | かける (kakeru) |
|---|---|---|
| make a call : K 001 | | make a call : K 001 |
| give a ring : K 002 | | give a ring : K 002 |
| | | telephone : K 003 |
| phone : DENWA 001 | | break : KAKERU 001 |
| telephone : DENWA 002 | | pour : KAKERU 002 |
| | | hang : KAKERU 003 |

181, 182

WORD CONVERTING APPARATUS UTILIZING GENERAL DICTIONARY AND COOCCURENCE DICTIONARY TO DISPLAY PRIORITIZED CANDIDATE WORDS

BACKGROUND OF THE INVENTION

1. Field of the Invention

The present invention relates to a word converting apparatus for converting a word to another word, and more particularly to a word converting apparatus having a capability to recognize a cooccurrent relationship between words that are entered.

2. Description of the Related Art

Word converting apparatus, e.g., kana-to-kanji converting apparatus for converting kana characters (Japanese phonetic alphabetical characters) into kanji characters (Japanese ideographic alphabetical characters), sometimes use a cooccurrent relationship between words to obtain correct converted results. For example, a Japanese kana word "atsui" has a plurality of kanji candidates including '暑い' (atsui), '厚い' (atsui), etc. to convert to. If a cooccurrent relationship between '紙' (kami) and '厚い' (atsui) and also between '夏' (natsu) and '暑い' (atsui) is used, then it is possible to convert "atsui kami" properly to '厚い紙' (atsui kami) and also "atsui natsu" properly to '暑い夏' (atsui natsu) all at once.

An Note: The Japanese word '暑い' means "warm", the Japanese word '厚い' means "thick", the Japanese word '紙' means "paper", and the Japanese word '夏' means "summer".

It is important to inform the user that the converted results which have been achieved are highly reliable on the basis of information representing the cooccurrent relationship which the word converting apparatus has. If the user is not informed that a converted result is highly reliable when it is a word which the user is not accustomed to or a word of a language other than his own tongue, then the user may not be certain about the converted result and may tend to compare again candidate alternatives including other conversion candidates, resulting in a burdensome process for the user.

One conventional word converting apparatus displays conversion candidates in a cooccurrent relationship with the same attribution to show the user that these conversion candidates are in a cooccurrent relationship (see, for example, Japanese laid-open patent publication No. 5-151199).

FIG. 1 of the accompanying drawings shows an example of a screen image displayed in a conventional word converting apparatus. Specifically, FIG. 1 illustrates a converted result with respect to an entered string of Japanese characters "kotoshi no natsu wa totemo atsui". The word '夏' (natsu) and the word '暑い' (atsui) are given the same attribution, indicating that these words are in a cooccurrent relationship.

Note: The Japanese word '今年' means "this year", the Japanese character 'の' is used as a particle, the Japanese character 'は' is used as a particle, and the Japanese word 'とても' means "very".

However, the above conventional word converting apparatus has been problematic in that when the word converting apparatus recognizes a plurality of cooccurrent relationships containing one word, it does not show the user that there are combinations other than the first conversion candidate even if there are possibly a plurality of converted results.

FIGS. 2(*a*) and 2(*b*) of the accompanying drawings show examples of screen images displayed in a conventional word converting apparatus. In the example shown in FIG. 2(*a*), a cooccurrent relationship is displayed. In the example shown in FIG. 2(*b*), no cooccurrent relationship is displayed.

It is assumed that when a string of Japanese characters "kami o suku", for example, is entered, there are two possible converted results '紙を漉く' (kami o suku) and '髪を梳く' (kami o suku), and both are registered as cooccurrent relationships in the word converting apparatus.

Note: The Japanese character 'を' is used as a particle, the Japanese word '漉く' means "make (paper)", the Japanese word '髪' means "hair", and the Japanese word '梳く' a means "comb".

It is assumed that first, the word converting apparatus selects '紙を漉く' (kami o suku), displaying a cooccurrent relationship between the word '紙' (kami) and the word '漉く' (suku) (see FIG. 2(*a*)). The word '紙' (kami) and the word '漉く' (suku) are given attribution. However, the user is not aware that there is another cooccurrent relationship with respect to the words '髪を梳く' (kami o suku).

Even when the user reselects the converted result with respect to "kami" and changes it to '髪' (kami), only the attribution disappears (see FIG. 2(*b*)), and the user is given no positive way of recognizing any information indicating that '梳く' (suku) should be selected for "suku", though such information is retained in the word converting apparatus.

In order for the user to recognize such information, it is necessary to rely on such coincidence that when the word '髪' (kami) and the word '梳く' (suku) happen to be selected at the same time, they are given the same attribution as a result.

Another problem, which arises under the same circumstances, is that once a certain word which is in a cooccurrent relationship to another word is replaced with another converted result (which is not in a cooccurrent relationship to the other word), the display of any attribution indicative of the cooccurrent relationship disappears, and cannot be used again.

For example, it is assumed that only a cooccurrent relationship '紙/漉く' (kami/suku) is registered for a combination of Japanese words "kami/suku". When a converted result '紙を漉く' (kami o suku) is displayed based on such a cooccurrent relationship, if the user reselects '好く' (suku) for '漉く' (suku), then the user has no way of obtaining again information indicating that there is a cooccurrent relationship between the word '紙' (kami) and the word '漉く' (suku). The user is allowed to use such information only when he reselects '漉く' (suku) for '好く' (suku) while in atrial-and-error process. However, such an opportunity occurs as a coincidence in the trial-and-error process.

Note: The Japanese word '好く' means "like".

According to still another problem, even if the user knows a cooccurrent relationship of '髪を梳く' (kami o suku), for the user to reselect words for the words '紙を漉く' (kami osuku) after they have been selected in the word converting apparatus, it is necessary to change the word '紙' (kami) to the word '髪' (kami) and then change the word '漉く' (suku) to the word '梳く' (suku). Since the user needs to select converted results repeatedly twice, a large burden is imposed on the user.

When a string of words contains a plurality of cooccurrent relationships of the same intensity, some displayed attribution is not clear as to which combination of words it gives a cooccurrent relationship to.

FIGS. 3(*a*) and 3(*b*) show examples of screen images displayed in a conventional word converting apparatus. In the example shown in FIG. 3(*a*), a correct conversion is displayed. In the example shown in FIG. 3(*b*), an incorrect conversion is displayed.

When a string of Japanese characters "natsu wa atsui kami da to atsui", for example, is entered, a correct converted result is '夏は厚い紙だと暑い' (natsu wa atsui kami da to atsui) (see FIG. 3(*a*)).

Note: The Japanese character 'は' is used as a particle, the Japanese character 'だ' is used as an adverb, and the Japanese character 'と' is used as a particle.

If a combination of the word "natsu" and the following "atsui" and a combination of the word "kami" and the word "atsui" at the end of the string are recognized as being in a cooccurrent relationship, and the string is erroneously converted to '夏は暑い紙だと厚い' (natsu wa atsui kami da to atsui) (see FIG. 3(*b*)), then the pattern of attribution shown in FIG. 3(*b*) is the same as the pattern of attribution shown in FIG. 3(*a*) which illustrates the correct converted result.

As described above, when a string of words contains a plurality of cooccurrent relationships, an erroneous recognition of a combination of words in a cooccurrent relationship cannot be distinguished from a correct recognition. Therefore, the display of attribution indicative of a cooccurrent relationship is not highly reliable.

SUMMARY OF THE INVENTION

It is therefore an object of the present invention to provide a word converting apparatus which is capable of switching between a plurality of converted results based on cooccurrent relationships with respect to the same word or between a converted result based on a cooccurrent relationship and a converted result not based on a cooccurrent relationship with respect to the same word, freely as indicated by the user.

Another object of the present invention is to provide a word converting apparatus which is capable of clearly indicating which combination of words it has recognized a cooccurrent relationship about if there are a plurality of cooccurrent relationships in a string of words.

Still another object of the present invention is to provide a word converting apparatus which is easily capable of selecting a converted result based on a cooccurrent relationship.

To achieve the above objects, there is provided in accordance with the present invention a word converting apparatus comprising:

an input unit for entering a string of characters;

a general dictionary for holding converted results and converted-result IDs (identifications) with respect to entries;

a cooccurrence dictionary for holding converted results, cooccurrent examples, and converted-result IDs with respect to each of words in a combination of cooccurrent words;

a word recognizer for dividing a string of characters entered by the input unit into a string of words by referring to the general dictionary;

a cooccurrence recognizer for recognizing cooccurrent relationships between the words divided by the word recognizer, by using the cooccurrence dictionary;

a result storage unit for storing converted results and converted-result IDs with respect to each of the words divided by the word recognizer, in order of priority;

a candidate storage unit for storing a converted result stored in the result storage unit so as to correspond to a word if the converted result stored in the result storage unit is derived from the general dictionary, and searching the cooccurrence dictionary for a cooccurrent example and storing the cooccurrent example so as to correspond to a word if the converted result stored in the result storage unit is derived from the cooccurrence dictionary;

a converter for storing converted results corresponding to the words divided by the word recognizer, in the result storage unit by referring to the general dictionary, and, if a cooccurrent relationship is recognized between the words by the cooccurrence recognizer, storing a corresponding combination of converted results and converted-result IDs in the result storage unit by referring to the cooccurrence dictionary, and replacing the converted results in the result storage unit according to the order of priority;

a display unit for displaying the converted results in the result storage unit; and a candidate selector for displaying the converted results and cooccurrent examples stored in the result storage unit, in a candidate selection menu on the display unit when the words are indicated and candidate selection is indicated, and, if a candidate alternative in the candidate selection menu is selected, instructing the converter to give highest priority to a selected converted result or a converted result corresponding to a selected cooccurrent example, using a converted-result ID as a key.

The candidate selector highlights a word for which candidate selection is indicated, in the converted results displayed on the display unit, and simultaneously highlights the candidate alternative selected in the candidate selection menu.

The converted-result IDs in the general dictionary and the converted-result IDs in the cooccurrence dictionary are distinguishable from each other, from which the candidate selector decides whether a converted result is derived from the general dictionary or the cooccurrence dictionary based on a converted-result ID.

When a converted result of highest priority in the result storage unit is changed, the converter shifts a converted result previously stored in the result storage unit to lower priority, and adjusts the cooccurrent relationship of the converted result previously stored in the result storage unit if the converted result previously stored in the result storage unit is derived from the cooccurrence dictionary.

When a string of characters is entered from the input unit, the word recognizer refers to the general dictionary and divides the string of characters into a string of words.

The converter stores converted results corresponding to the string of words in the result storage unit, and sends the string of words to the cooccurrence recognizer.

The cooccurrence recognizer refers to the cooccurrence dictionary to check if there is a combination of words in a cooccurrent relationship within the string of words. If there is a combination of words in a cooccurrent relationship within the string of words, then the cooccurrence recognizer sends the combination of words to the converter.

The converter reads converted results corresponding to the combination of words in a cooccurrent relationship from the concurrent dictionary, and adds the converted results to the result storage unit. When the converted results are stored in the result storage unit, the result storage unit generates a string of characters to be presented to the user as conversion candidates corresponding to the converted results, by referring to the converted results in the result storage unit and the cooccurrence dictionary, and stores the generated string of characters therein.

If a converted result is derived from the general dictionary, then the converted result itself is employed as a conversion candidate. If a converted result is derived from the cooccurrence dictionary, then a cooccurrent example in the cooccurrence dictionary is employed as a conversion candidate and stored. Each of the conversion candidates is assigned a converted-result ID which uniquely indicate which converted result it corresponds to.

The display unit displays the data stored in the result storage unit. When the user indicates a word and also indicates candidate selection, the candidate selector reads conversion candidates for the word from the candidate storage unit, and displays the conversion candidates on the display unit. When the user selects either one of the conversion candidates, the candidate selector sends the converted-result ID of the conversion candidate to the converter.

When the converted-result ID is sent to the converter, the converter instructs the result storage unit to give highest priority to the converted result which corresponds to the converted-result ID.

Based on the command from the converter, the result storage unit changes the data stored therein, and the display unit changes its displayed data according to the changed data in the result storage unit.

The above and other objects, features, and advantages of the present invention will become apparent from the following description with reference to the accompanying drawings which illustrate examples of the present invention.

BRIEF DESCRIPTION OF THE DRAWINGS

FIG. 5 is a diagram showing a portion of data in a general dictionary in the word converting apparatus shown in FIG. 4;

FIG. 6 is a diagram showing a portion of data in a cooccurrence dictionary in the word converting apparatus shown in FIG. 4;

FIG. 7 is a diagram showing a portion of data in a result storage unit in the word converting apparatus shown in FIG. 4;

FIG. 8 is a diagram showing a portion of data in a candidate storage unit in the word converting apparatus shown in FIG. 4;

FIG. 19 is a diagram showing a portion of data in the result storage unit in the word converting apparatus shown in FIG. 4;

FIG. 20 is a diagram showing an example of transition of the data in the result storage unit shown in FIG. 19;

FIG. 21 is a diagram showing an example of transition of the data in the result storage unit shown in FIG. 20;

FIG. 23 is a diagram showing a portion of data in a general dictionary in the word converting apparatus shown in FIG. 22;

FIG. 24 is a diagram showing a portion of data in a cooccurrence dictionary in the word converting apparatus shown in FIG. 22;

FIG. 25 is a diagram showing a portion of data in a result storage unit in the word converting apparatus shown in FIG. 22;

FIG. 26 is a diagram showing a portion of data in a candidate storage unit in the word converting apparatus shown in FIG. 22;

DETAILED DESCRIPTION OF THE PREFERRED EMBODIMENTS

1st Embodiment

Figure 1:
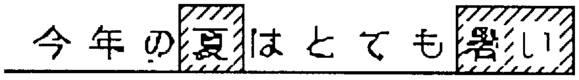
FIG. 1 is a diagram showing an example of a screen image displayed in a conventional word converting apparatus.
Figure 2A:
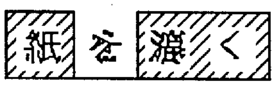
FIGS. 2(*a*) and 2(*b*) are diagrams showing examples of screen images displayed in a conventional word converting apparatus, FIG. 2(*b*) showing a displayed cooccurrent relationship and FIG. 2(*b*) showing no displayed cooccurrent relationship.
Figure 2B:
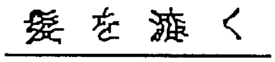
Figure 3A:
FIGS. 3(*a*) and 3(*b*) are diagrams showing examples of screen images displayed in a conventional word converting apparatus, FIG. 3(*a*) showing a displayed correct converted example and FIG. 3(*b*) showing a displayed incorrect converted example.
Figure 3B:
Figure 4:
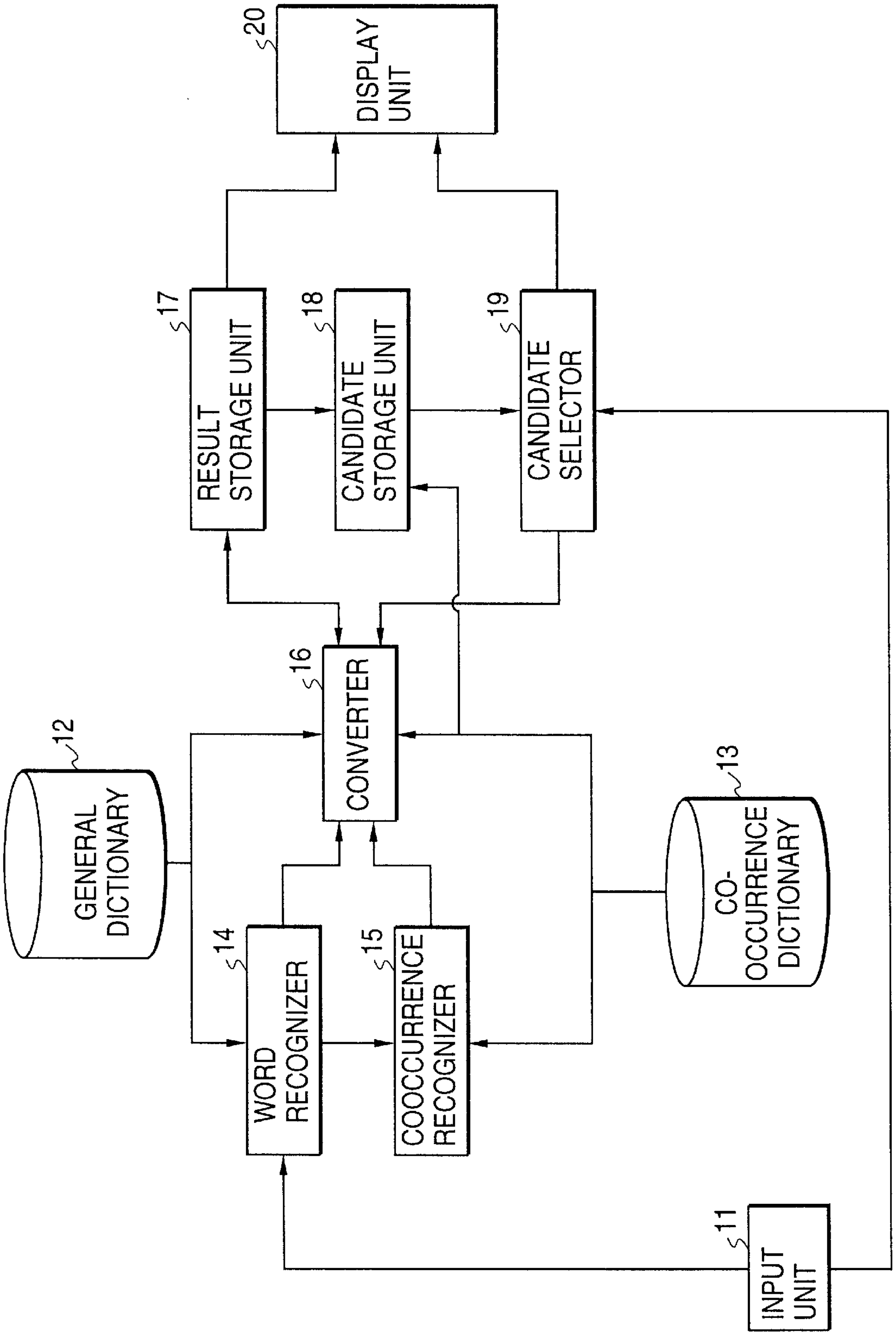
FIG. 4 is a block diagram of a word converting apparatus according to a first embodiment of the present invention.

FIG. 4 shows in block form a word converting apparatus according to a first embodiment of the present invention.

As shown in FIG. 4, the word converting apparatus according to the first embodiment of the present invention comprises an input unit 11 for entering a string of characters and indicating candidate selection, a general dictionary 12 for storing converted results with respect to entries (words) and result-of-conversion IDs (identifications), a cooccurrence dictionary 13 for storing combinations of words in cooccurrent relationships, converted results of words, cooccurrent examples, and converted-result IDs, a word recognizer 14 for dividing a string of characters into a string of words using the general dictionary 12, a cooccurrence recognizer 15 for recognizing a cooccurrent relationship between words using the cooccurrence dictionary 13, a converter 16 for producing a converted result using the general dictionary 12 and the cooccurrence dictionary 13, a result storage unit 17 for storing converted results, a candidate storage unit 18 for storing conversion candidates, a candidate selector 19 for displaying conversion candidates from the candidate storage unit 18 on a display unit 20 for selection, and a display unit 20 for displaying converted results from the result storage unit 17.

FIG. 5 shows a portion of data stored in the general dictionary 12 shown in FIG. 4.

In FIG. 5, the general dictionary 12 stores data representing '髪' (kami), '紙' (kami), '神' (kami), and '上' (kami) as converted results with respect to an entry "kami", and data representing '好く' (suku), '梳く' (suku), '漉く' (suku), and '透く' (suku) as converted results with respect to an entry "suku". The converted results are assigned respective unique 7-digit converted-result IDs, for example.

Note: The Japanese word '神' means "god", the Japanese word '上' means "the top", and Japanese word '透く' means "be transparent".

FIG. 6 shows a portion of data stored in the cooccurrence dictionary 13 shown in FIG. 4.

In FIG. 6, the cooccurrence dictionary 13 stores data representing that there is a cooccurrent relationship between a word "kami" and a word "suku", there are two combinations '紙/漉く' (kami/suku) and '髪/梳く' (kami/suku) as converted results based on the cooccurrent relationship, and there are two phrases '紙を漉く' (kami o suku) and '髪を梳く' (kami o suku) as cooccurrent examples of these combinations, data representing that there is a cooccurrent relationship between a word "atsui" and a word "natsu", they should be converted to '暑い/夏' (atsui/natsu), and there is a phrase '暑い夏' (atsui natsu) as a cooccurrent example thereof, and data representing that there is a cooccurrent relationship between a word "atsui" and a word "kami", they should be converted to '厚い/紙' (atsui/kami), and there is a phrase '厚い紙' (atsui kami) as a cooccurrent example thereof.

The combinations of the converted results and the cooccurrent examples are assigned respective unique 4-digit converted-result IDs, for example. Since the converted-result IDs contained in the general dictionary 12 and the converted-result IDs contained in the cooccurrence dictionary 13 have different numbers of digits, a review of a converted-result ID clearly indicates whether a dictionary from which the corresponding converted result is derived is the general dictionary 12 or the cooccurrence dictionary 13.

FIG. 7 shows a portion of data in the result storage unit 17 shown in FIG. 4.

As shown in FIG. 7, the result storage unit 17 is divided into small areas corresponding to divided words, respectively. Each of the small areas comprises a word area 171 for storing words, a first result area 172 for holding converted results of highest priority, and a low-priority result area 173 for holding converted results of less than highest priority.

FIG. 8 shows a portion of data in the candidate storage unit 18 shown in FIG. 4.

As shown in FIG. 8, the candidate storage unit 18 is divided into small areas corresponding to divided words, respectively. Each of the small areas comprises a word area 181 for storing words and a candidate area 182 for holding conversion candidates.

Figure 9:
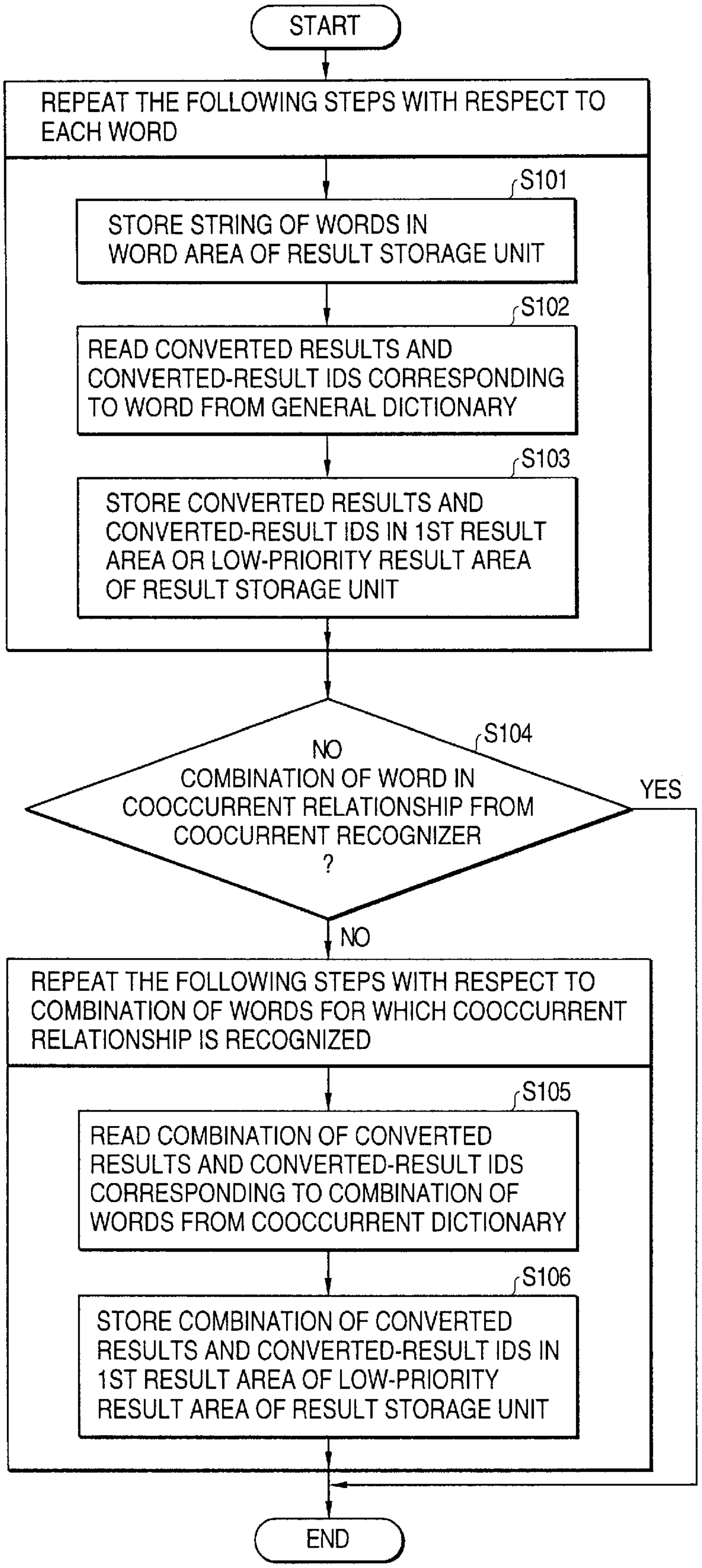
FIG. 9 is a flowchart of a processing sequence of a converter in the word converting apparatus shown in FIG. 4.

FIG. 9 shows a processing sequence of the converter 16 shown in FIG. 4.

As shown in FIG. 9, the processing sequence of the converter 16 comprises a step S101 of storing a string of words, a step S102 of reading converted results, a step S103 of storing converted results, a step S104 of determining an output signal from the cooccurrence recognizer 15, a step S105 of reading a combination of converted results, and a step S106 of storing a combination of converted results.

Figure 10:
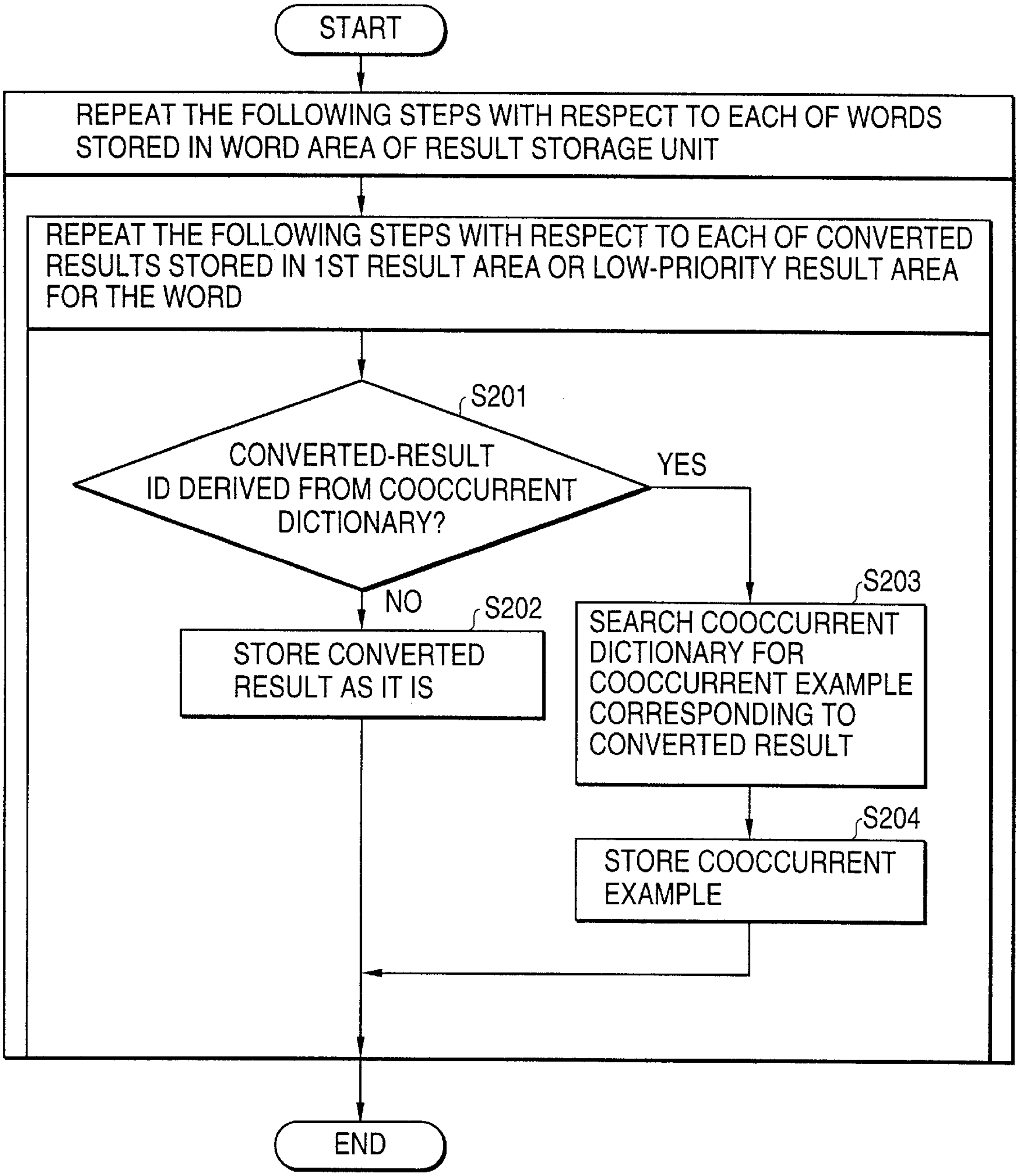
FIG. 10 is a flowchart of a processing sequence of the candidate storage unit in the word converting apparatus shown in FIG. 4.

FIG. 10 shows a processing sequence of the candidate storage unit 18 shown in FIG. 4.

As shown in FIG. 10, the processing sequence of the candidate storage unit 18 comprises a step S201 of determining a dictionary from which a converted-result ID is derived, a step S202 of storing a converted result, a step S203 of searching for a cooccurrent example, and a step S204 of storing a cooccurrent example.

Figure 11:
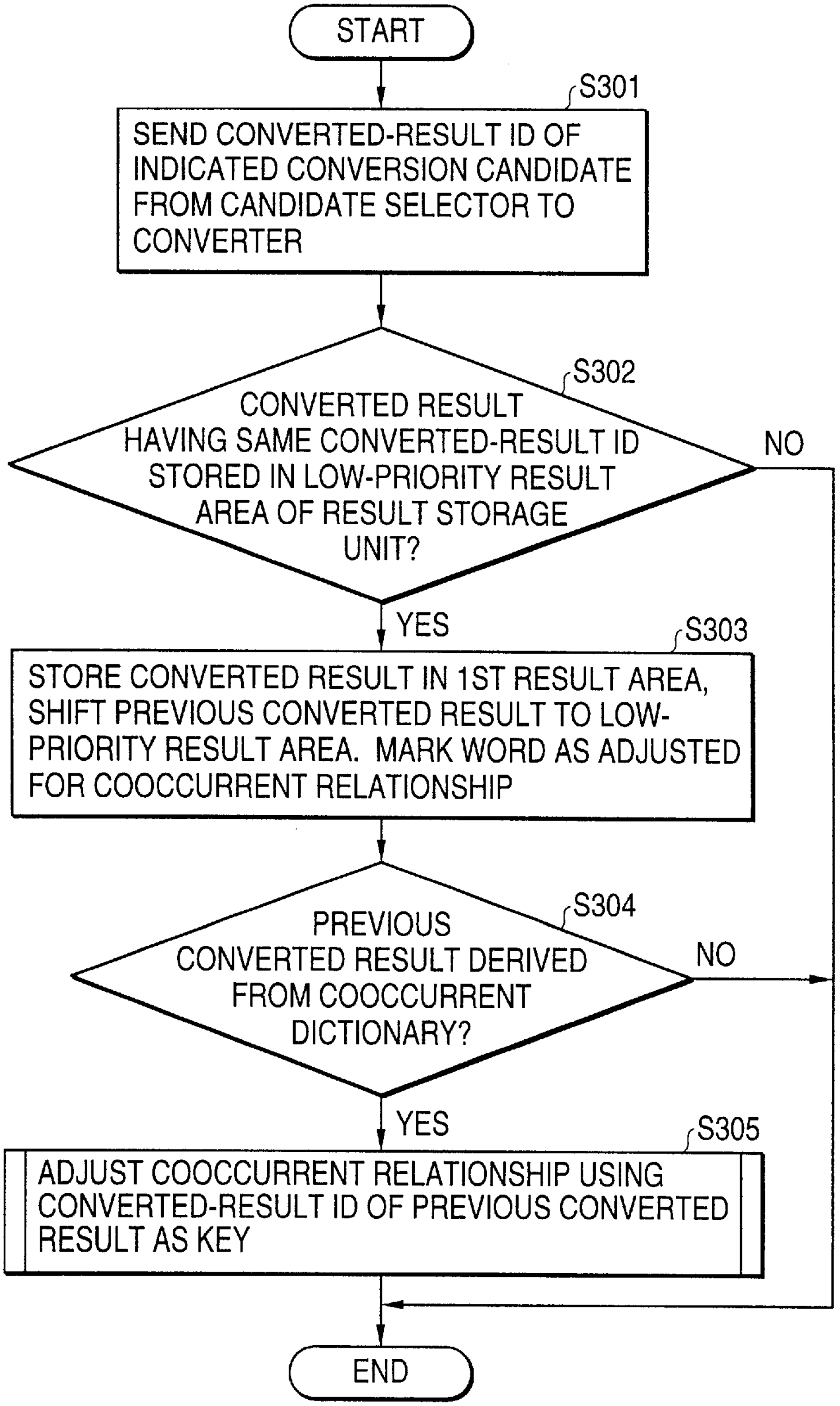
FIG. 11 is a flowchart of a processing sequence of a candidate selector and the converter at the time candidate selection is indicated.

FIG. 11 shows a processing sequence of the candidate selector 19 and the converter 16 at the time candidate selection is indicated.

As shown in FIG. 11, the processing sequence of the candidate selector 19 and the converter 16 at the time candidate selection is indicated comprises a step S301 of sending a converted-result ID of an indicated conversion candidate, a step S302 of determining the storage of a converted result having the same converted-result ID, a step S303 of switching around converted results, a step S304 of deciding whether a converted result is derived from the cooccurrence dictionary 13, and a step S305 of adjusting a cooccurrent relationship.

Figure 12:
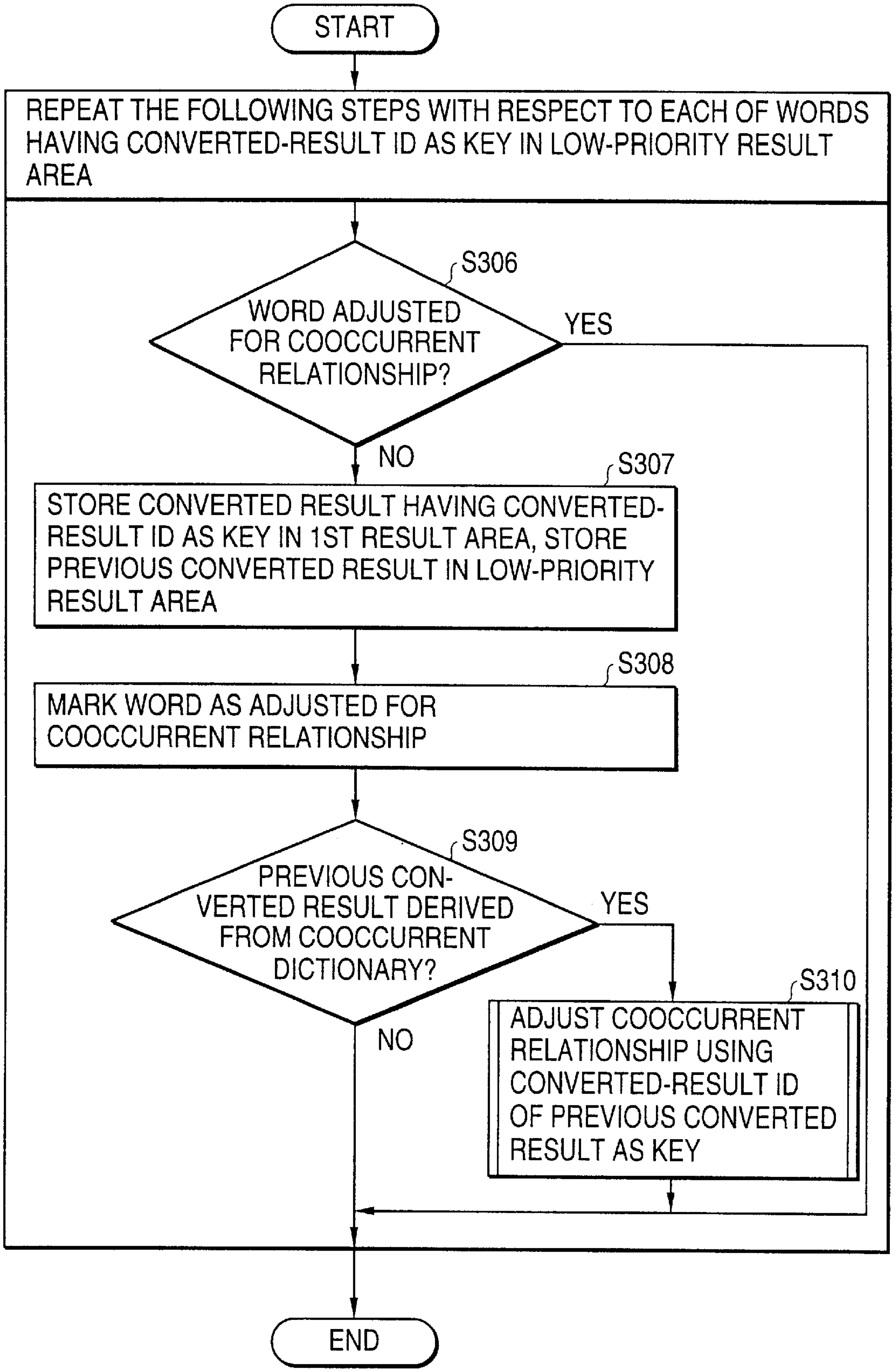
FIG. 12 is a flowchart of a step of adjusting a cooccurrent relationship in the processing sequence shown in FIG. 11.

FIG. 12 shows in detail the step S305 of adjusting a cooccurrent relationship in the processing sequence shown in FIG. 11.

As shown in FIG. 12, the step S305 of adjusting a cooccurrent relationship comprises a step S306 of deciding whether a cooccurrent relationship has been adjusted, a step S307 of switching around converted results, a step S308 of marking words as being adjusted for a cooccurrent relationship, a step S309 of deciding whether a converted result is derived from the cooccurrence dictionary 13, and a step S310 of adjusting a cooccurrent relationship. In the step S310, the step S305 repeats itself recursively.

Operation of the word converting apparatus thus arranged will be described below.

When a string of characters "kami o suku" is entered from the input unit 11, the word recognizer 14 refers to the general dictionary 12 and divides the string of characters "kami o suku" into a string of words "kami/o/suku" which is sent to the converter 16.

The converter 16 stores the string of words "kami/o/suku" in the word area 171 of the result storage unit 17 in the step S101, searches the general dictionary 12 for all converted results and converted-result IDs with respect to the words in the step S102, and stores the converted results and converted-result IDs in the first result area 172 and the low-priority result area 173 of the result storage unit 17 in the step S103.

The converted result of highest priority is stored in the first result area 172, and other converted results are stored in the low-priority result area 173. It is assumed that the general dictionary 12 stores converted results in order of priority according to a learning function or the like (not shown). The steps S101~S103 are repeated for each of the words.

FIG. 7 shows the data which are stored in the result storage unit 17 at this time.

As shown in FIG. 7, the Japanese word '髪' (kami) is selected as a converted result of highest priority with respect to the word "kami", and the Japanese word '好く' (suku) is selected as a converted result of highest priority with respect to the word "suku". These selected words are stored in the first result area 172. Other converted results are stored in the low-priority result area 173. There is no converted result with respect to the word 'を' (o).

Then, the cooccurrence recognizer 15 is started to refer to the cooccurrence dictionary 13 and check if there is a combination of words held in a cooccurrent relationship within the string of words.

In the illustrated embodiment, the cooccurrence recognizer 15 recognizes that the word "kami" and the word "suku" are in a cooccurrent relationship based on the data stored in the cooccurrence dictionary 13 shown in FIG. 6, and sends the combination of the word "kami" and the word "suku" that are in a cooccurrent relationship to the converter 16.

When supplied with the combination of the words that are in a cooccurrent relationship from the cooccurrence recognizer 15 ("NO" in the step S104), the converter 16 reads a combination of converted results and a converted-result ID corresponding to the combination of the words that are in a cooccurrent relationship from the cooccurrence dictionary 13 in the step S105, and adds the combination of converted results and the converted-result ID with highest priority to the result storage unit 17 in the step S106.

The steps S105, S106 are repeated with respect to the combination of the words that are in a cooccurrent relationship.

In the illustrated embodiment, the combination of the converted results '紙' (kami) and '漉く' (suku) and the combination of the converted results '髪' (kami) and '梳く' (suku) are read from the cooccurrence dictionary 13 shown in FIG. 6, and added to the result storage unit 17.

Figures 13, 14:
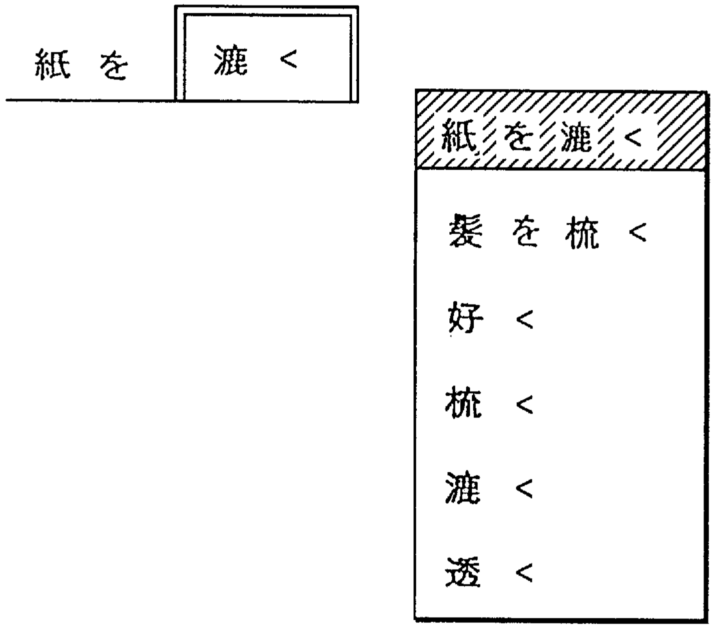
FIG. 13 is a diagram showing an example of transition of the data in the result storage unit shown in FIG. 7.
FIG. 14 is a diagram showing an example of a converted result and a candidate selection menu which are displayed on a display unit in the word converting apparatus shown in FIG. 4.

FIG. 13 shows an example of transition of the data stored in the result storage unit 17 shown in FIG. 7.

As shown in FIG. 13, the combination of the converted results '紙' (kami) and '漉く' (suku) and the combination of the converted results '髪' (kami) and '梳く' (suku) which are read from the cooccurrence dictionary 13 are added to the first result area 172 and the high-priority position of the low-priority result area 173, and the previous converted results are shifted successively to lower-priority positions. Whether a converted result is derived from the general dictionary 12 or the cooccurrence dictionary 13 is decided based on the converted-result ID which accompanies the converted result.

FIG. 14 shows an example of a converted result and a candidate selection menu which are displayed on the display unit 20 shown in FIG. 4.

As shown in FIG. 14, the display unit 20 displays the converted results '紙' (kami) and '漉く' (suku) which are stored in the first result area 172 of the result storage unit 17. The word 'を' (o) which has no converted result is displayed as it is on the display unit 17.

The candidate storage unit 18 is triggered to start when the converted results are stored in the result storage unit 17, and generates a string of characters which will be indicated as conversion candidates to the user.

First, the candidate storage unit 18 reads a converted result and a converted-result ID from the result storage unit 17.

If the converted result is derived from the general dictionary 12 ("NO" in the step S201), then the candidate storage unit 18 adds the converted result as a conversion candidate in the step S202.

If the converted result is derived from the cooccurrence dictionary 13 ("YES" in the step S201), then the candidate storage unit 18 searches the cooccurrence dictionary 13 for a corresponding cooccurrent example, using the converted-result ID as a key, in the step S203, and adds the cooccurrent example as a conversion candidate in the step S204.

The steps S201~S204 are repeated with respect to each of the words stored in the word area 171 of the result storage unit 17 and each of the converted results stored in the first result area 172 and the low-priority result area 173 with respect to each of the words.

FIG. 5 shows the data stored in the candidate storage unit 18 at this time.

For example, since either one of the converted results '紙' (kami) and '漉く' (suku) which are obtained from the cooccurrent relationship '紙/漉く' (kami/suku) is assigned a converted-result ID "K001" (see FIG. 13), the corresponding cooccurrent example '紙を漉く' (kami o suku) is stored as a conversion candidate.

The word '紙' (kami) derived from the general dictionary 12 is stored itself as a conversion candidate (see FIG. 6).

Similarly, since either one of the converted results '髪' (kami) and '梳く' (suku) which are obtained from the cooccurrent relationship '髪/梳く' (kami/suku) is assigned a converted-result ID "K002" (see FIG. 13), the corresponding cooccurrent example '髪を梳く' (kami o suku) is stored as a conversion candidate.

If the user indicates candidate selection from the input unit 11 with respect to a word displayed on the display unit 20, the candidate selector 19 reads conversion candidates for the word from the candidate storage unit 18, and displays the conversion candidates as a candidate selection menu on the display unit 20 for the user to choose from.

For example, if the user indicates candidate selection with respect to the word "suku", the candidate selector 19 reads all conversion candidates from the candidate storage unit 18 shown in FIG. 8 as shown in FIG. 14, and displays them as a candidate selection menu on the display unit 20.

In FIG. 14, the display unit 20 displays a converted result '紙を漉く' (kami o suku) and a candidate selection menu for the word '漉く' (suku) to the right of the converted result. The word '漉く' (suku) in the converted result is highlighted to indicate that the candidate selection menu being displayed is for this word. The phrase '紙を漉く' (kami o suku) is highlighted in the candidate selection menu to indicate that the present converted result '漉く' (suku) is selected from the cooccurrence dictionary 13 based on the cooccurrent relationship '紙を漉く' (kami o suku). By looking at the displayed data, therefore, the user can readily understand that the present converted result is based on the cooccurrent relationship and can also recognize the contents of the cooccurrent relationship.

The display unit 20 also displays a candidate alternative '髪を梳く' (kami o suku) in the candidate selection menu. This candidate alternative corresponds to the entry indicated by the converted-result ID "K002" in the cooccurrence dictionary 13 (see FIG. 6).

According this embodiment, therefore, the user can readily recognize, by just looking at candidate alternatives in the candidate selection menu, what cooccurrent relationship can possibly be present other than the cooccurrent relationship reflected in the converted result. This feature has not been found in the conventional word converting apparatus.

Now, it is assumed that the user intends to convert the words "kami o suku" to '髪を梳く' (kami o suku).

The displayed candidate selection menu for the word "suku" shown in FIG. 14 contains a second candidate alternative '髪を梳く' (kami o suku). When the user selects this second candidate alternative, the candidate selector 19 sends the converted-result ID "K002" assigned to this candidate alternative to the converter 16 in the step S301.

The converter 16 checks if the result storage unit 17 stores a converted result which has the converted-result ID "K002" in the step S302. If the result storage unit 17 stores such a converted result, then the priority of the converted result is increased, and the converted result is stored in the first result area 172. The converted result which has previously been stored in the first result area 172 is stored in the low-priority result area 173 in the step S303.

These words, i.e., "kami" and "suku" in this embodiment, are marked as being adjusted for a cooccurrent relationship.

Figures 15, 16:
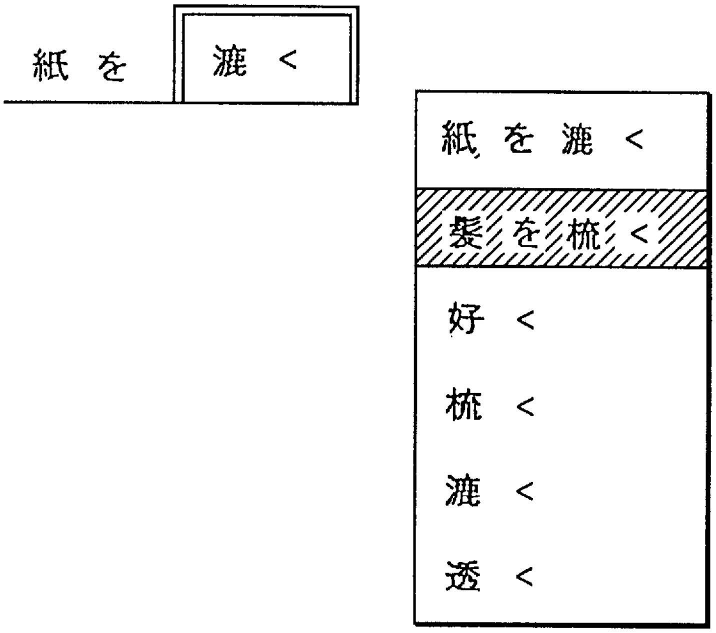
FIG. 15 is a diagram showing an example of transition of the data in the result storage unit shown in FIG. 13.
FIG. 16 is a diagram showing an example of transition of the converted result and the candidate selection menu shown in FIG. 14.

FIG. 15 shows an example of transition of the data in the result storage unit 17 shown in FIG. 13 at this time.

Either one of the converted results '髪' (kami) and '梳く' (suku) which are derived from the cooccurrence dictionary 13 is assigned the same converted-result ID "K002", and stored in the first result area 172 of highest priority.

Then, the converter 16 decides whether the converted results stored in the first result area 172 are derived from the cooccurrence dictionary 13, based on the converted-result ID in the step S304. If not derived from the cooccurrence dictionary 13, then the processing is ended. If derived from the cooccurrence dictionary 13, then the cooccurrent relationship is adjusted using the converted-result ID of the converted results stored in the first result area 172 as a key in the step S305.

In this embodiment, the converted results stored in the first result area 172 are '紙' (kami) and '漉く' (suku) and derived from the cooccurrence dictionary 13. Therefore, the cooccurrent relationship is adjusted using their converted-result ID "K001" as a key.

Specifically, if the cooccurrent relationship has not been adjusted ("NO" in the step S306), then all the words of the converted results having the converted-result ID "K002" in the low-priority result area 173 are stored in the first result area 172 in the step S307.

The words whose converted results have thus been changed in priority are marked as being adjusted for the cooccurrent relationship so that they will not be changed in priority again in the step S308.

If the converted results derived from the cooccurrence dictionary 13 are shifted from the first result area 172 into the low-priority result area 173 ("YES" in the step S309), then the process of adjusting the cooccurrent relationship is started recursively in the step S310.

In this embodiment, the converted results having the converted-result ID "K001" as a key are stored so as to correspond to "kami" and "suku". Since these words have already been marked as being adjusted for the cooccurrent relationship, no further change in priority is effected, and the data shown in FIG. 15 are established as final data.

FIG. 16 shows an example of transition of the converted result and the candidate selection menu shown in FIG. 14.

As shown in FIG. 16, only by selecting the candidate '髪' (kami) to change from '紙' (kami) in FIG. 14, a change from '漉く' (suku) to '梳く' (suku) is simultaneously carried out.

According to the first embodiment as described above, inasmuch as all converted results of words in a cooccurrent relationship are simultaneously replaced only when a cooccurrent example is selected in the candidate selection menu, the word converting apparatus according to the first embodiment places a much less burden on the user than the conventional word converting apparatus. Furthermore, even after another converted result is selected to cancel a cooccurrent relationship, the converted result based on the cooccurrent relationship can be restored anytime by reselecting a cooccurrent example from among candidate alternatives. This also offers a great advantage over the conventional word converting apparatus.

As described above, when a plurality of cooccurrent relationships are recognized with respect to a certain word, all the cooccurrent relationships are displayed as conversion candidates in the form of cooccurrent examples. Therefore, the user can readily know that there is a selectable conversion candidate other than the present first conversion candidate. Because all converted results of words in a cooccurrent relationship can be changed only by selecting a cooccurrent example selected from among candidate alternatives, the number of steps required to select cooccurrent words is greatly reduced. The word converting apparatus according to this embodiment is particularly advantageous in carrying out operations which the conventional word converting apparatus have failed to effect or which are tedious for the user, i.e., to reselect a conversion candidate based on a cooccurrent relationship after the cooccurrent relationship has been canceled, e.g., to change '紙/漉く' (kami/suku) to '紙/好く' (kami/suku) '紙/漉く' (kami/suku).

Figure 17:
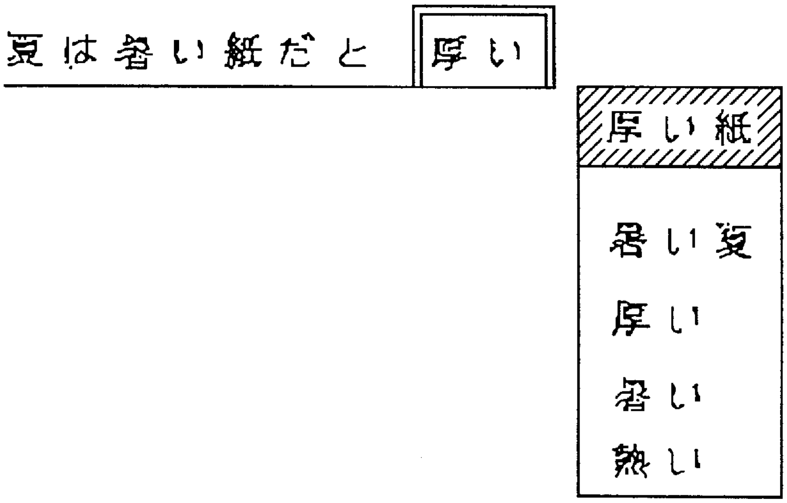
FIG. 17 is a diagram showing another example of a converted result and a candidate selection menu which are displayed on the display unit in the word converting apparatus shown in FIG. 4.
Figure 18:
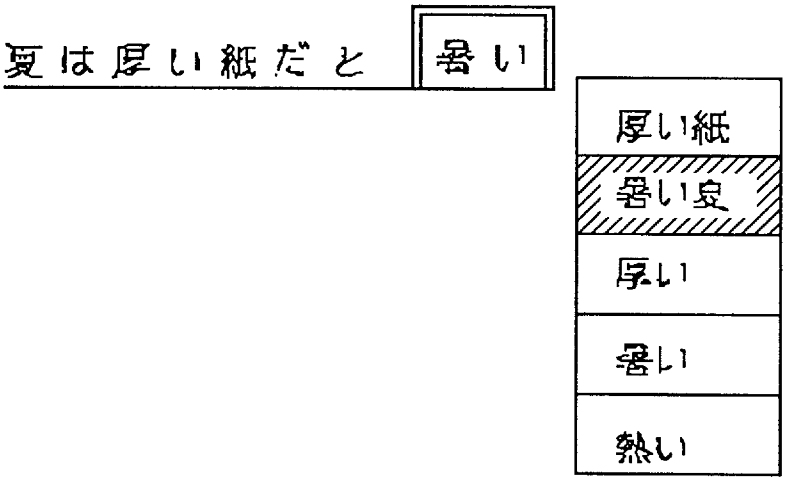
FIG. 18 is a diagram showing an example of transition of the converted result and the candidate selection menu shown in FIG. 17.

FIG. 17 shows another example of a converted result and a candidate selection menu which are displayed on the display unit 20 shown in FIG. 4. FIG. 18 shows an example of transition of the converted result and the candidate selection menu shown in FIG. 17.

It is assumed that as shown in FIG. 17, a string of characters "natsu wa atsui kami da to atsui" is erroneously converted to '夏は暑い紙だと厚い' (natsu wa atsui kami da to atsui).

In this case, only by selecting a second candidate alternative '暑い夏' (atsui natsu) with respect to "atsui" at the end of the character string, the user can obtain a correct conversion '夏は厚い紙だと暑い' (natsu wa atsui kami da to atsui).

Operation of the word converting apparatus for producing such a correct conversion will be described below.

FIG. 19 shows a portion of data in the result storage unit 17 shown in FIG. 4.

Immediately after the character string has been converted, the result storage unit 17 stores data as shown in FIG. 19. Two cooccurrent relationships "natsu/atsui" and "kami/ atsui" relative to the word "atsui" are recognized, and stored as first and second converted results with respect to the word "atsui".

When the user indicates selection of a candidate alternative '暑い夏' (atsui natsu) in the candidate selection menu displayed in FIG. 17, a corresponding converted-result ID "K003" is sent to the result storage unit 17 in the step S301. Thereafter, since a converted result having the same converted-result ID is stored in the low-priority result area 173 of the result storage unit 17 ("YES" in the step S302), the corresponding converted result is stored in the first result area 172 in the step S303.

FIG. 20 shows an example of transition of the data in the result storage unit 17 shown in FIG. 19 in the step S303.

As shown in FIG. 20, the converted results with respect to the second word "atsui" are switched around. After the second word "atsui" is marked as being adjusted for the cooccurrent relationship in the step S303, the converter 16 checks if the converted result that has been shifted to the low-priority result area 173 by the priority switching is derived from the cooccurrence dictionary 13 in the step S304.

If not derived from the cooccurrence dictionary 13, then the processing comes to an end.

If derived from the cooccurrence dictionary 13, then the overall cooccurrent relationship is adjusted in the step S305.

Inasmuch as the word '厚い' (atsui) shifted to the low-priority result area 173 has a converted-result ID "K004" derived from the cooccurrence dictionary 13, the cooccurrent relationship is adjusted using the converted-result ID "K004" as a key.

Specifically, if all the words having the converted-result ID "K004" in the low-priority result area 173 have not been adjusted for the cooccurrent relationship ("NO" in the step S306), then their converted results are stored in the first result area 172 in the step S307.

The words whose converted results have thus been changed in priority are marked as being adjusted for the cooccurrent relationship so that they will not be changed in priority again in the step S308.

If the converted results derived from the cooccurrence dictionary 13 are shifted from the first result area 172 into the low-priority result area 173 by the priority change ("YES" in the step S309), then the process of adjusting the cooccurrent relationship is started recursively in the step S310.

FIG. 21 shows an example of transition of the data in the result storage unit 17 shown in FIG. 20.

In FIG. 21, the first word "atsui" has a converted result '厚い' (atsui) with converted-result ID "K004" in the low-priority result area 173, the converted results are switched around as shown in FIG. 21.

Because the converted result '暑い' having the converted-result ID "K003" has been shifted from the first result area 172 into the low-priority result area 173, the process of adjusting the cooccurrent relationship is started using the converted-result ID "K003" as a key.

However, the process of adjusting the cooccurrent relationship does not progress but is finished since there is no word having the converted-result ID "K003" in the low-priority result area 173. The data shown in FIG. 21 are therefore final data.

As a consequence, the display unit 20 displays a correct conversion '夏は厚い紙だと暑い' (natsu wa atsui kami da to atsui) as shown in FIG. 18.

In this embodiment, therefore, even when an associated word in a cooccurrent relationship is erroneously recognized, it can be corrected simply by selecting an appropriate cooccurrent example.

2nd Embodiment

Figure 22:
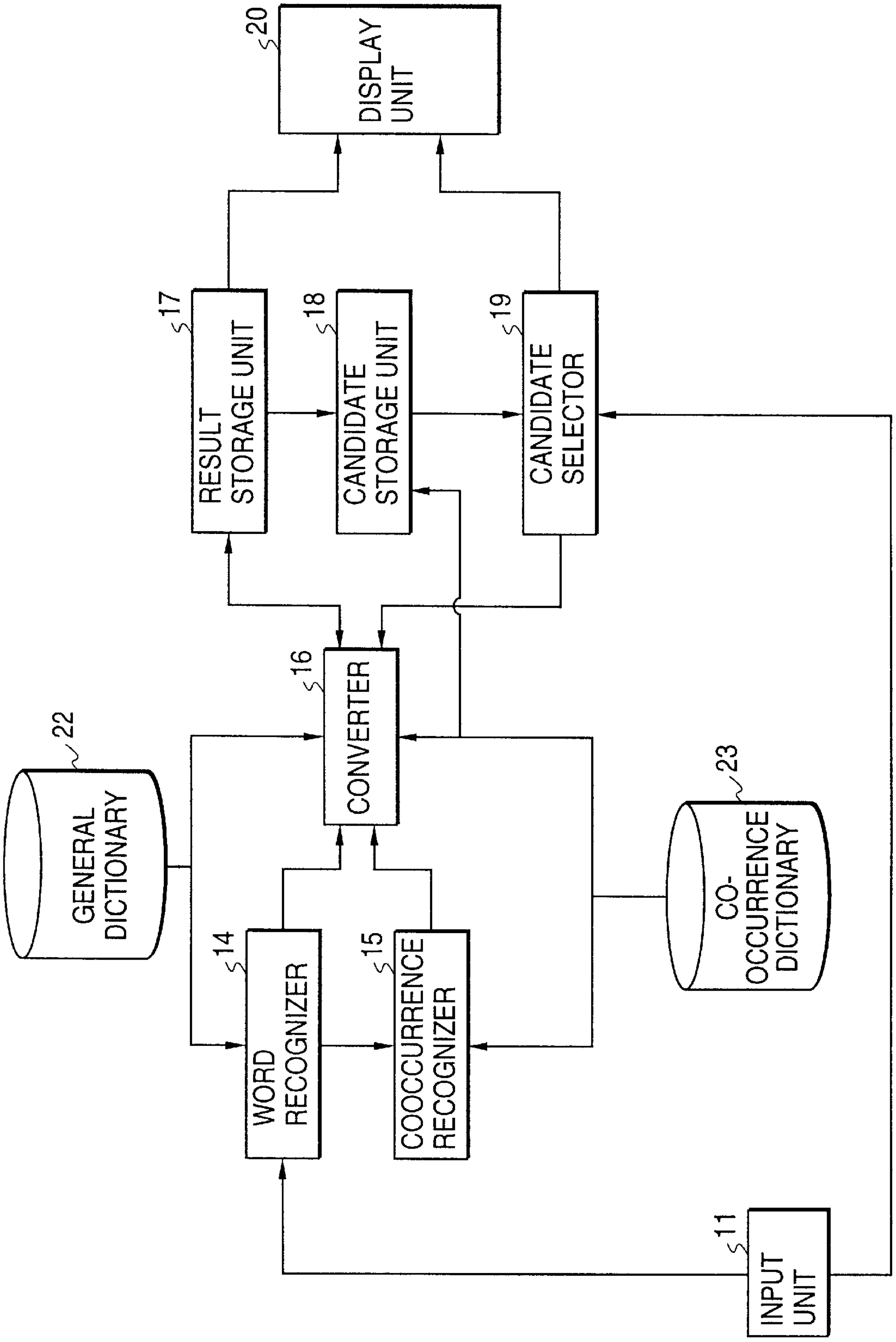
FIG. 22 is a block diagram of a word converting apparatus according to a second embodiment of the present invention.

FIG. 22 shows in block form a word converting apparatus according to a second embodiment of the present invention.

As shown in FIG. 22, the word converting apparatus according to the second embodiment differs from the word converting apparatus according to the first embodiment in that it has a general dictionary 22 and a cooccurrence dictionary 23 in place of the general dictionary 12 and the cooccurrence dictionary 13, respectively, of the word converting apparatus according to the first embodiment, and that it operates as a Japanese-English word converting apparatus for converting an entered string of characters including kana and kanji characters to a string of Japanese and English characters. Those parts of the word converting apparatus shown in FIG. 22 which are identical to those of the word converting apparatus shown in FIG. 4 are denoted by identical reference numerals, and will not be described in detail below.

FIG. 23 shows a portion of data in the general dictionary 22 shown in FIG. 22.

The general dictionary 22 stores data representing Japanese words as entries including '電話' (denwa), 'かける' (kakeru), etc. and English words corresponding to the entries as converted results. Converted results with respect to the Japanese word '電話' (denwa) include "telephone" and "phone", and converted results with respect to the Japanese word 'かける' (kakeru) include "break", "pour", and "hang". The converted results are assigned respective unique converted-result IDs.

FIG. 24 shows a portion of data in the cooccurrence dictionary 23 shown in FIG. 22.

As shown in FIG. 24, the cooccurrence dictionary 23 stores data representing a combination of Japanese words as entries and combinations of English words as converted results corresponding to the Japanese words that are in a cooccurrent relationship. Specifically, the data stored in the cooccurrence dictionary 23 indicate that there is a cooccurrent relationship between the Japanese word '電話' (denwa) and the Japanese word 'かける' (kakeru), and the following three converted results occur based on the cooccurrent relationship:

First, because Japanese words '電話をかける' (denwa o kakeru) can be expressed in English by "make a call", the English word "call" is associated with the Japanese word '電話' (denwa) and the English word "make" is associated with the Japanese word 'かける' (kakeru). A cooccurrent example of these words is "make a call".

Secondly, because Japanese words '電話をかける' (denwa o kakeru) can be expressed in English by "give a ring", the English word "ring" is associated with the Japanese word '電話' (denwa) and the English word "give" is associated with the Japanese word 'かける' (kakeru). A cooccurrent example of these words is "give a ring".

Thirdly, because Japanese words '電話をかける' (denwa o kakeru) can be expressed in English by "telephone", the English word "telephone" is associated with the Japanese word 'かける' (kakeru). There is no converted result with respect to the Japanese word '電話' (denwa). A cooccurrent example of these words is "telephone".

The word converting apparatus according to the second embodiment operates as follows: It is assumed that a string of characters including kana and kanji characters '電話をかける' (denwa o kakeru) is entered into the word converting apparatus.

The word recognizer 14 refers to the general dictionary 22 and divides the string of characters '電話をかける' (denwa o kakeru) into a string of words. Since the Japanese words '電話' (denwa) and 'かける' (kakeru) are stored as entries, the entered character string is divided into '電話/を/かける' (denwa/o/kakeru), and the divided words are sent to the converter 16.

The converter 16 reads all converted results with respect to the words from the general dictionary 22, and stores the converted results in the result area.

The cooccurrence recognizer 15 is started to refer to the cooccurrence dictionary 23 and check if there is a combination of words held in a cooccurrent relationship within the string of words. In the illustrated embodiment, the cooccurrence recognizer 15 recognizes that the word '電話' (denwa) and the word 'かける' (kakeru) are in a cooccurrent relationship, and sends them to the converter 16.

The converter 16 reads a corresponding cooccurrent example from the cooccurrence dictionary 23, and adds the cooccurrent example to the result storage unit 17.

FIG. 25 shows a portion of data in the result storage unit 17 shown in FIG. 22 at this time.

As shown in FIG. 25, the first result area 172 stores the English word "call" with respect to the Japanese word '電話' (denwa) and the English word "make" with respect to the Japanese word 'かける' (kakeru), as converted results based on the cooccurrent relationship.

Then, the candidate storage unit 18 is started to generate strings of characters to be presented as conversion candidates to the user.

As with the word converting apparatus shown in FIG. 4, a converted result derived from the general dictionary 22 is added itself as a conversion candidate, and a cooccurrent example corresponding to a converted result derived from the cooccurrence dictionary 23 is added as a conversion candidate.

FIG. 26 shows a portion of data in the candidate storage unit 18 shown in FIG. 22 at this time.

As shown in FIG. 26, the display unit 20 arranges successively the data stored in the first result area 172 of the result storage unit 17, and displays a string of characters 'call を make' (call o make) as a converted result with respect to the Japanese words '電話をかける' (denwa o kakeru). When the user indicates candidate selection with respect to the displayed word "make", the candidate selector 19 reads a conversion candidate for the word from the candidate storage unit 18, and displays the conversion candidate on the display unit 20.

Figure 27:
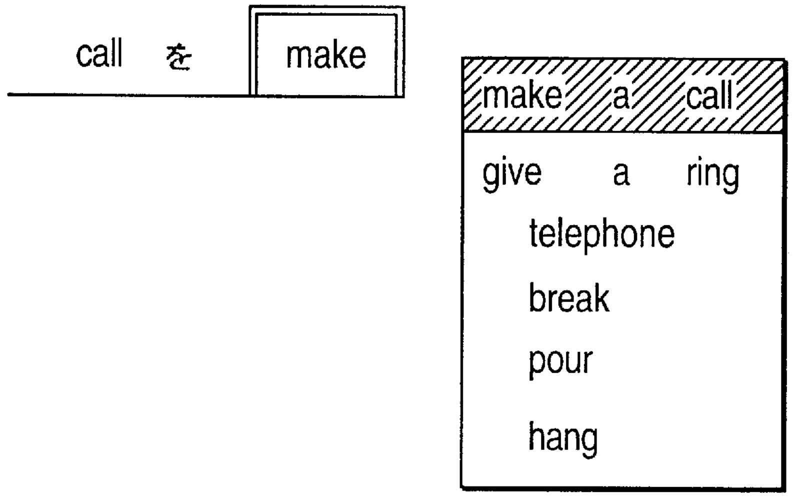
FIG. 27 is a diagram showing an example of a converted result and a candidate selection menu which are displayed on a display unit in the word converting apparatus shown in FIG. 22.

FIG. 27 shows an example of a converted result and a candidate selection menu which are displayed on the display unit 20 shown in FIG. 22 at this time.

As shown in FIG. 27, the display unit 20 displays in the candidate selection menu cooccurrent examples "make a call", "give a ring", and "telephone" as conversion candidates for the word "make", and also converted results "break", "pour", and "hang" as converted results derived from the general dictionary 22.

When the user selects the conversion candidate "give a ring", a converted-result ID "K002" assigned to the conversion candidate is sent to the converter 16 as with the word converting apparatus shown in FIG. 4.

The converter 16 stores the converted result having the converted-result ID "K002" in the first result area 172 of the result storage unit 17.

Figure 28:
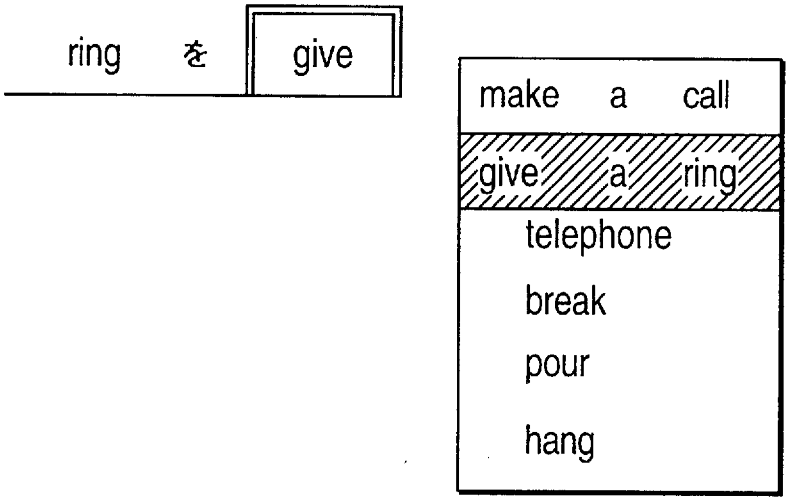
FIG. 28 is a diagram showing an example of transition of the converted result and the candidate selection menu shown in FIG. 27.

FIG. 28 shows an example of transition of the converted results and the candidate selection menu shown in FIG. 27 at this time.

As shown in FIG. 28, the English word "ring" as a converted result with respect to the Japanese word '電話' (denwa) and the English word "give" as a converted result with respect to the Japanese word 'かける' (kakeru) are displayed in response to the selection of the cooccurrent example "give a ring".

If the general and cooccurrent dictionaries store data representing Japanese words including kanji characters, etc. as entries and data representing words of a foreign language such as English as converted results in the word converting apparatus according to the first embodiment, then the word converting apparatus operates as a word converting apparatus for converting Japanese words to words of the foreign language, as with the word converting apparatus according to the second embodiment. Similarly, the word converting apparatus may be arranged to operate as a word converting apparatus for converting words of a foreign language to Japanese words or converting words of a foreign language to words of another foreign language.

The word converting apparatus may be modified to incorporate inflections of cooccurrent examples stored in the cooccurrence dictionary depending on inflections of associated words in cooccurrent relationships for presenting cooccurrent examples as conversion candidates suited to actual situations. The cooccurrence dictionary may be modified to store various items of information for assisting the user in selecting candidates in addition to cooccurrent examples.

According to the present invention, as described above, when a word in a converted result displayed on the display unit is indicated and candidate selection is indicated, converted results and cooccurrent examples stored in the candidate storage unit are displayed in a candidate selection menu for the user to select a converted result. Therefore, a plurality of cooccurrent relationships containing one word can be established. Even when there are a plurality of converted results, all candidate alternatives for converted results based on cooccurrent relationships are presented to the user in the form of cooccurrent examples. Consequently, the user can select a converted result simply by indicating one of the candidate alternatives. The user can switch freely between a plurality of converted results based on cooccurrent relationships or between a converted result based on a cooccurrent relationship and a converted result not based on a cooccurrent relationship for selecting an appropriate candidate alternative. The word processing apparatus allows the user to carry out operations which are impossible to carry out with the conventional word processing apparatus or which the user finds tedious, particularly for switching around combinations of converted results or reselecting a conversion candidate based on a cooccurrent relationship after the cooccurrent relationship has been canceled.

Furthermore, even if a string of words contains a plurality of cooccurrent relationships, the word converting apparatus clearly indicates which combination of words is referred to in recognizing a cooccurrent relationship. Because the user can easily notice an error when an associated word in a cooccurrent relationship is erroneously recognized, the reliability of a converted result is increased, and the error can easily be corrected.

Moreover, when a cooccurrent example is selected from among conversion candidates for words, converted results are rearranged in the result storage unit based on the priority sequence thereof, and converted results of related words are replaced altogether according to the selection. Therefore, the burden on the user in reselecting a cooccurrent relationship is reduced.

While preferred embodiments of the present invention have been described using specific terms, such description is for illustrative purposes only, and it is to be understood that changes and variations may be made without departing from the spirit or scope of the following claims.

What is claimed is:

1. A word converting apparatus comprising:

an input unit for entering a string of characters;

a general dictionary for holding converted results and converted-result IDs with respect to entries;

a cooccurrence dictionary for holding converted results, cooccurrent examples, and converted-result IDs with respect to each of the words in a combination of cooccurrent words;

a word recognizer for dividing a string of characters entered by said input unit into a string of words by referring to said general dictionary;

a cooccurrence recognizer for recognizing cooccurrent relationships between the words divided by said word recognizer, by using said cooccurrence dictionary;

a result storage unit for storing converted results and converted-result IDs with respect to each of the words divided by said word recognizer, in order of priority;

a candidate storage unit for storing a converted result stored in said result storage unit so as to correspond to a word if the converted result stored in said result storage unit is derived from said general dictionary, and searching said cooccurrence dictionary for a cooccurrent example and storing the cooccurrent example so as to correspond to a word if the converted result stored in said result storage unit is derived from said cooccurrence dictionary;

a converter for storing converted results corresponding to the words divided by said word recognizer, in said result storage unit by referring to said general dictionary, and, if a cooccurrent relationship is recognized between the words by said cooccurrence recognizer, storing a corresponding combination of converted results and converted-result IDs in said result storage unit by referring to said cooccurrence dictionary, and replacing the converted results in said result storage unit according to the order of priority;

a display unit for displaying the converted results in said result storage unit; and a candidate selector for displaying the converted results and cooccurrent examples stored in said result storage unit, in a candidate selection menu on said display unit when the words are indicated and candidate selection is indicated, and, if a candidate alternative in said candidate selection menu is selected, instructing said converter to give highest priority to a selected converted result or a converted result corresponding to a selected cooccurrent example, using a converted-result ID as a key.

2. A word converting apparatus according to claim 1, wherein said candidate selector highlights a word for which candidate selection is indicated, in the converted results displayed on said display unit, and simultaneously highlights the candidate alternative selected in said candidate selection menu.

3. A word converting apparatus according to claim 1, wherein the converted-result IDs in said general dictionary and the converted-result IDs in said cooccurrence dictionary are distinguishable from each other, and wherein said candidate selector decides whether a converted result is derived from said general dictionary or said cooccurrence dictionary based on a converted-result ID.

4. A word converting apparatus according to claim 1, wherein when a converted result of highest priority in said result storage unit is changed, said converter shifts a converted result previously stored in said result storage unit to lower priority, and adjusts the cooccurrent relationship of the converted result previously stored in said result storage unit if the converted result previously stored in said result storage unit is derived from said cooccurrence dictionary.

5. A word converting apparatus according to claim 4, wherein said converter adjusts the cooccurrent relationship of a converted result by giving highest priority to converted results having the same converted-result ID with respect to a word which has not been adjusted for a cooccurrent relationship, shifting a converted result previously stored in said result storage unit to lower priority, and further adjusting the cooccurrent relationship of the converted result previously stored in said result storage unit if the converted result previously stored in said result storage unit is derived from said cooccurrence dictionary.

* * * * *